United States Patent
Seok

(10) Patent No.: US 9,113,479 B2
(45) Date of Patent: Aug. 18, 2015

(54) METHOD FOR MULTICAST FRAME TRANSMISSION AND DUPLICATED MULTICAST FRAME DETECTION

(75) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 264 days.

(21) Appl. No.: 13/122,721

(22) PCT Filed: Oct. 15, 2009

(86) PCT No.: PCT/KR2009/005942
§ 371 (c)(1),
(2), (4) Date: Apr. 5, 2011

(87) PCT Pub. No.: WO2010/044624
PCT Pub. Date: Apr. 22, 2010

(65) Prior Publication Data
US 2011/0199953 A1     Aug. 18, 2011

Related U.S. Application Data

(60) Provisional application No. 61/105,429, filed on Oct. 15, 2008, provisional application No. 61/158,737, filed on Mar. 9, 2009.

(30) Foreign Application Priority Data

Dec. 23, 2008  (KR) .................. 10-2008-0132451
Oct. 14, 2009  (KR) .................. 10-2009-0097492

(51) Int. Cl.
*H04W 74/08* (2009.01)
*H04W 4/06* (2009.01)

(52) U.S. Cl.
CPC ............ *H04W 74/0816* (2013.01); *H04W 4/06* (2013.01)

(58) Field of Classification Search
CPC ... H04W 74/0816; H04W 4/06; H04L 1/1829
USPC ......................................................... 370/312
See application file for complete search history.

(56) References Cited

U.S. PATENT DOCUMENTS

| | | | | |
|---|---|---|---|---|
| 5,717,688 | A * | 2/1998 | Belanger et al. | 370/331 |
| 6,674,738 | B1 * | 1/2004 | Yildiz et al. | 370/338 |
| 7,366,464 | B2 * | 4/2008 | Iacono et al. | 455/25 |
| 7,529,222 | B2 * | 5/2009 | Kim et al. | 370/348 |
| 7,570,921 | B2 * | 8/2009 | Sugar et al. | 455/63.4 |
| 7,716,379 | B2 * | 5/2010 | Ruan et al. | 709/250 |
| 7,787,410 | B2 * | 8/2010 | Ding et al. | 370/318 |
| 7,818,475 | B2 * | 10/2010 | Frey et al. | 710/33 |
| 8,130,737 | B2 * | 3/2012 | Singh et al. | 370/338 |

(Continued)

FOREIGN PATENT DOCUMENTS

| | | |
|---|---|---|
| WO | 03-077453 | 9/2003 |
| WO | 2007-083636 | 7/2007 |

*Primary Examiner* — Gary Mui
(74) *Attorney, Agent, or Firm* — Lee, Hong, Degerman, Kang & Waimey

(57) ABSTRACT

A method and apparatus of transmitting a multicast frame in a wireless communication system is provided. The method comprises transmitting a request to send (RTS) frame to stations (STAs) included in a multicast group by using an omni-directional antenna, and receiving a clear to send (CTS) frame transmitted by the STAs included in the multicast group in response to the RTS frame, and transmitting the multicast frame to the STAs included in the multicast group by using a directional antenna.

9 Claims, 9 Drawing Sheets

(56) References Cited

U.S. PATENT DOCUMENTS

| | | | |
|---|---|---|---|
| 8,305,948 B2 * | 11/2012 | Surineni et al. | 370/312 |
| 8,351,365 B2 * | 1/2013 | Seok | 370/312 |
| 8,588,417 B2 * | 11/2013 | Wentink | 380/270 |
| 2003/0054807 A1 * | 3/2003 | Hsu et al. | 455/414 |
| 2007/0025317 A1 * | 2/2007 | Bolinth et al. | 370/347 |
| 2007/0171858 A1 * | 7/2007 | Grandhi et al. | 370/328 |
| 2008/0273700 A1 * | 11/2008 | Wentink | 380/270 |
| 2009/0285146 A1 * | 11/2009 | Sugar et al. | 370/312 |
| 2010/0218198 A1 * | 8/2010 | Ruan et al. | 719/327 |

\* cited by examiner

METHOD FOR MULTICAST FRAME TRANSMISSION AND DUPLICATED MULTICAST FRAME DETECTION

CROSS-REFERENCE TO RELATED APPLICATIONS

This application is the National Stage filing under 35 U.S.C. 371 of International Application No. PCT/KR2009/00005942, filed on Oct. 15, 2009, which claims the benefit of earlier filing date and right of priority to Korean Application Nos. 10-2009-0097492, filed on Oct. 14, 2009 and 10-2008-0132451, filed on Dec. 23, 2008, and also claims the benefit of U.S. Provisional Application Ser. Nos. 61/158,737, filed on Mar. 9, 2009 and 61/105,429, filed on Oct. 15, 2008, the contents of which are incorporated by reference herein in their entirety.

TECHNICAL FIELD

The present invention relates to a wireless local area network (WLAN), and more particularly, to a multicast/broadcast procedure in a very high throughput (VHT) WLAN system.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data transfer rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data transfer rate to up to 54 Mbps by using the OFDM technology. Disadvantageously, however, the IEEE 802.11a has a shorter communication distance than the IEEE 802.11b. Similarly to the IEEE 802.11b, the IEEE 802.11g implements the data transfer rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data transfer rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. A very high throughput (VHT) WLAN system is one of IEEE 802.11 WLAN systems which have recently been proposed to support a data processing rate of 1 Gbps or higher. The VHT WLAN system is named arbitrarily. To provide a throughput of 1 Gbps or higher, a feasibility test is currently being conducted for the VHT system which uses 4?4 MIMO and a channel bandwidth of 80 MHz or higher.

As a mechanism for achieving a throughput of 1 Gbps or higher for the VHT WLAN, two methods are currently discussed, that is, a method of using a band of 6 GHz or lower and a method of using a band of 60 GHz. Among them, the method of using a channel of the band of 60 GHz is drawing more attention. This is caused by the fact that a channel using the band of 6 GHz or lower is in use also by other wireless communication systems, and thus available radio resources are limited. Such a disadvantage can be overcome by using a channel with the band of 60 GHz. However, the band of 60 GHz has a demerit in that its service coverage is narrower than that of the band of 6 GHz or lower according to a feature of high frequency. Therefore, there is a need for a method for solving the narrow service coverage in a VHT WLAN system using the band of 60 GHz.

Meanwhile, data transmission of the WLAN system can be classified into unicast, multicast, and broadcast according to the number of target devices or destination devices. Unlike in the unicast where a destination device of transmit (Tx) data is a single terminal, the destination device of the Tx data is a plurality of terminals in the multicast and the broadcast. In the multicast, a target address or a destination address of a Tx frame is specified as a multicast group address. The broadcast is special multicast in which the multicast group address specifies all terminals. Therefore, when simply referred to as 'multicast' in the following description, it will be interpreted such that 'broadcast' is also included unless it is not allowed by nature.

Multicast transmission delivers a single data stream simultaneously to a plurality of destination terminals, and thus data traffic can be reduced and a channel can be effectively used. Such multicast can be useful to provide a variety of information such as various applications, e.g., video conference, corporate communication, distance learning, software distribution, stock quotes, news, etc. Further, the multicast can also be used for a game played by multiple users over a wireless home network or for an application which shares streaming data.

The multicast is based on the concept of a multicast group, that is, a group of recipient terminals having an interest in a specific data stream. The terminals having an interest in receiving data to be multicast have to be first registered to the multicast group in order to receive the data. In a medium access control (MAC) layer, the multicast group is specified by a multicast MAC address. In general, a higher layer than the MAC layer takes a charge of generation, registration, deregistration, and change of the multicast group. Those issues of generation, registration, or the like of the multicast group specified by the MAC address are irrelevant to the present invention, and thus description thereof will be omitted.

In multicast transmission, it is difficult to confirm whether a terminal registered to a specific multicast group, i.e., a destination terminal, has successfully received all pieces of data provided from a source terminal. In particular, the institute of electrical and electronic engineers (IEEE) 802.11 standard neither specifies an error recovery mechanism for multicast traffic nor provides any definition on a method capable of avoiding collision between a multicast frame and another frame. Therefore, a current multicast service does not guarantee that the destination terminal can completely and reliably receive data to be multicast.

A method of using an adaptive modulation scheme is taken into consideration as one method of guaranteeing reliability of multicast transmission. According to the adaptive modulation scheme, multicast transmission is achieved by a possible lowest modulation scheme so that all terminals registered to a corresponding multicast group can receive a multicast frame. However, the use of a low modulation scheme results in deterioration of a data transfer rate, which may impair improvement of a data throughput of a WLAN system.

DISCLOSURE OF INVENTION

Technical Problem

The present invention provides a multicast method capable of not only expanding service coverage but also ensuring reliability of multicast transmission in a wireless local area network (WLAN) system.

The present invention also provides a method of detecting a frame received in a duplicate manner by a station receiving a multicast frame when the multicast frame is transmitted using a directional antenna.

Solution to Problem

In an aspect, a method of transmitting a multicast frame in a wireless communication system is provided. The method comprises transmitting a request to send (RTS) frame to stations (STAs) included in a multicast group by using an omni-directional antenna, and receiving a clear to send (CTS) frame transmitted by the STAs included in the multicast group in response to the RTS frame, and transmitting the multicast frame to the STAs included in the multicast group by using a directional antenna.

The RTS frame may comprise information indicating an antenna mode to be used in transmission of the multicast frame.

The multicast frame may comprise a retransmission indicator field to provide information indicating whether the multicast frame is retransmitted.

The multicast frame may comprise a retransmission indicator field to provide information indicating whether a multicast frame transmitted immediately before transmission of the multicast frame is retransmitted.

In another aspect, a method of transmitting a multicast frame in a wireless communication system is provided. The method comprises transmitting a CTS-to-self frame which comprises a receiver address, a transmitter address, and a multicast group address and in which the receiver address is the same as the transmitter address, and transmitting the multicast frame to an STA included in a multicast group indicated by the multicast group address by using a directional antenna.

The CTS-to-self frame may further comprise information on an antenna mode to be used in transmission of the multicast frame.

The multicast frame may comprise a retransmission indicator field to provide information indicating whether the multicast frame is scheduled to be retransmitted.

The multicast frame may comprise a retransmission indicator field to provide information indicating whether a preceding multicast frame transmitted immediately before transmission of the multicast frame is scheduled to be retransmitted.

Advantageous Effects of Invention

According to the present invention, a wireless local area network (WLAN) can not only expand service coverage but also ensure reliability of multicast transmission.

MODE FOR THE INVENTION

Embodiments of the present invention described below can effectively apply to a multicast procedure of a very high throughput (VHT) wireless local area network (WLAN) system operating in a band of 60 GHz. However, the present invention is not limited thereto. For example, the embodiments of the present invention can also equally apply to a VHT WLAN system operating in a band of 6 GHz or lower.

In addition, in multicast, a target address or a destination address of a transmit (Tx) frame is specified as a multicast group address. Broadcast is special multicast in which the multicast group address specifies all terminals. Therefore, when simply referred to as 'multicast' in the following description, it will be interpreted that 'broadcast' is also included unless it is not allowed by nature.

Figure 1:
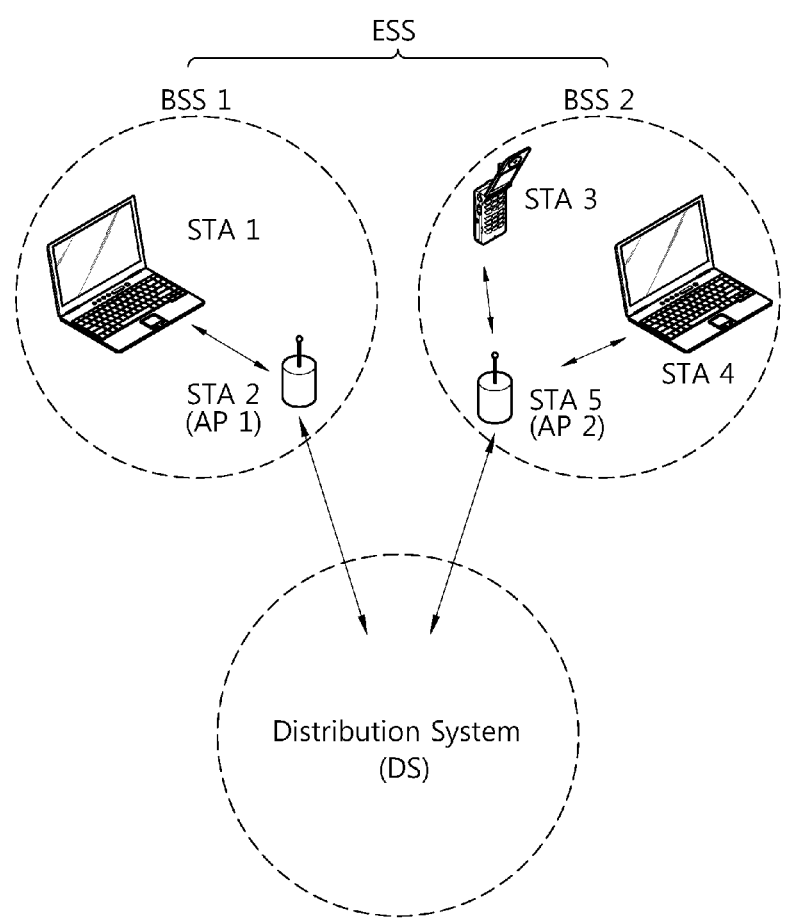
FIG. 1 is a schematic view showing an exemplary structure of a very high throughput (VHT) wireless local area network (WLAN) system according to an embodiment of the present invention.

FIG. 1 is a schematic view showing an exemplary structure of a VHT WLAN system according to an embodiment of the present invention.

Referring to FIG. 1, a WLAN system such as the VHT WLAN system includes one or more basis service sets (BSSs). The BSS is a set of stations (STAs) which are successfully synchronized to communicate with one another, and is not a concept indicating a specific region. As in the WLAN system to which the embodiment of the present invention is applicable, a BSS that supports a super high-rate data processing of 1 GHz or higher in a medium access control (MAC) service access point (SAP) is referred to as a VHT BSS.

The VHT BSS can be classified into an infrastructure BSS and an independent BSS (IBSS). The infrastructure BSS is shown in FIG. 1. Infrastructure BSSs (i.e., BSS1 and BSS2) include one or more non-access point (AP) STAs (i.e., Non-AP STA1, Non-AP STA3, and Non-AP STA4), AP STAs (i.e., AP STA1 and AP STA2) which are STAs providing a distribution service, and a distribution system (DS) connecting the plurality of AP STAs (i.e., AP STA1 and AP STA2). In the infrastructure BSS, an AP STA manages non-AP STAs of the BSS.

On the other hand, the IBSS is a BSS operating in an ad-hoc mode. Since the IBSS does not include the VHT STA, a centralized management entity for performing a management function in a centralized manner does not exist. That is, the IBSS manages the non-AP STAs in a distributed manner. In addition, in the IBSS, all STAs may consist of mobile STAs, and a self-contained network is configured since access to the DS is not allowed.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense. A VHT STA is defined as an STA that supports the super high-rate data processing of 1 GHz or higher in the multi-channel environment to be described below. In the VHT WLAN system to which the embodiment of the present invention is applicable, STAs included in the BSS may be all VHT STAs, or a VHT STA and a legacy STA (i.e., IEEE 802.11n-based HT STA) may coexist.

The STA for wireless communication includes a processor and a transceiver, and also includes a user interface, a display means, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (i.e., STA1, STA3, STA4, and STA5) are portable terminals operated by users. A non-AP STA may be simply referred to as an STA. The non-AP STA may also be referred to as a terminal, a wireless transmit/receive unit (WTRU), a user equipment (UE), a mobile station (MS), a mobile terminal, a mobile subscriber unit, etc. A non-AP VHT-STA (or simply VHT STA) is defined as a non-AP STA that supports the super high-rate data processing of 1 GHz or higher in the multi-channel environment to be described below.

The AP (i.e., AP1 and AP2) is a functional entity for providing access to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super high-rate data processing of 1 GHz or higher in the multi-channel environment to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical construction for interconnecting APs.

In a case where a VHT AP and/or a VHT STA use an omni-directional antenna in the VHT WLAN system, a problem may arise in that transmission reliability may not be able to be ensured in multicast transmission. The reason above is that, when multicast transmission is used under the premise that a plurality of VHT STAs simultaneously receive data, the plurality of VHT STAs are located in several places in a distributed manner and thus some VHT STAs may be located in a transmitter device (e.g., VHT AP) for multicasting a media stream whereas some other VHT STAs may be located in a long distance from each other. As described above, due to narrow service coverage of the VHT WLAN system, it is very difficult to ensure transmission reliability of a multicast media stream when the VHT STA is located far from the VHT AP (i.e., transmitter device) or when the VHT STA is located in a non-line of sight (NLOS) of the VHT AP. Such a problem is a significant issue when the VHT WLAN system operates in the band of 60 GHz due to its narrow service coverage. The same problem may also occur when the VHT WLAN system operates in the band of 6 GHz or lower.

To solve this problem, a method of using a directional antenna can be taken into consideration. The use of the directional antenna can improve not only service coverage but also transmission reliability. For this, however, a multicast service of the VHT WLAN system requires a protocol for using the directional antenna. Hereinafter, the protocol for using the directional antenna in the multicast service of the VHT WLAN system will be described.

The followings are assumed in an embodiment of the present invention described below.

First, a device for transmitting a media stream to be multicast, e.g., a VHT AP, supports transmission using a directional antenna (e.g., transmission using beamforming). This implies that the VHT AP can transmit a multicast stream in an omni-directional mode or a directional mode. When the VHT AP transmits the multicast stream in the omni-directional mode, VHT STAs adjacent to the VHT AP can successfully receive the multicast stream, whereas VHT STAs located in an NLOS cannot successfully receive the multicast stream. On the other hand, when the VHT AP transmits the multicast stream in the directional mode, VHT STAs located in a corresponding direction as well as the VHT STAs located in the NLOS can successfully receive the multicast stream.

According to the embodiment of the present invention, it is not necessary for the VHT STA receiving the multicast stream to support the directional antenna. That is, although some VHT STAs support reception using the directional antenna, other VHT STAs may not support the reception using the directional antenna. However, when the VHT AP transmits the multicast stream in the directional mode, the VHT STAs supporting the reception using the directional antenna can coordinate beamforming (BF) reception.

Under this assumption, the multicast frame can be transmitted and received according to four transmission/reception modes as following: 1) transmission in the omni-directional mode and reception in the omni-directional mode; 2) transmission in the omni-directional mode and reception in the directional mode; 3) transmission in the directional mode and reception in the omni-directional mode; and 4) transmission in the directional mode and reception in the directional mode. The VHT WLAN system can use any one of the four transmission/reception modes or two or more combinations of the four modes. According to the embodiment of the present invention, transmission in the omni-directional mode and transmission in the directional mode are both used together in order to expand service coverage of multicast transmission and to ensure transmission reliability. In addition, VHT STAs receiving the multicast stream preferably coordinate the reception mode according to the transmission mode, but the present invention is not limited thereto.

Figure 2:
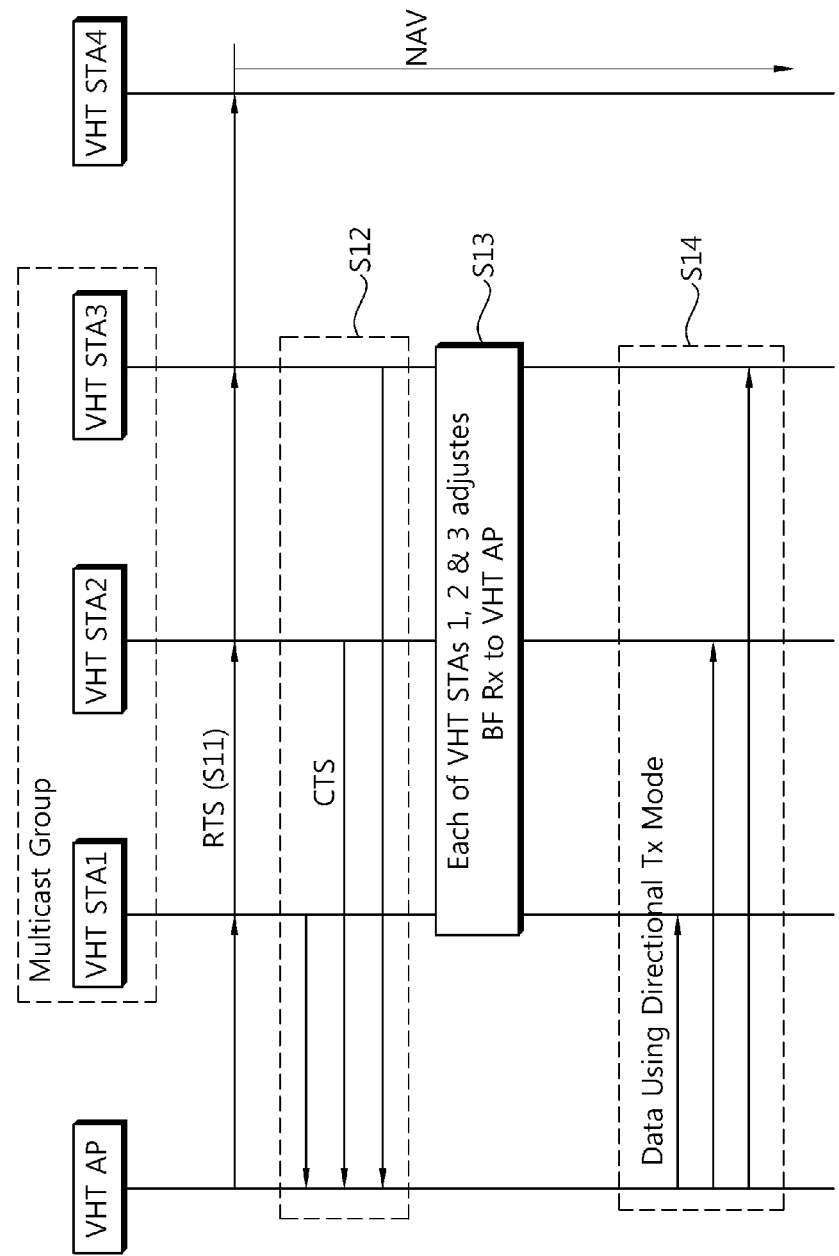
FIG. 2 is a message flow diagram of a multicast procedure according to an embodiment of the present invention.

FIG. 2 is a message flow diagram of a multicast procedure according to an embodiment of the present invention based on the aforementioned assumption.

First, a VHT AP transmitting a multicast frame determines a VHT STA transmitting the multicast frame by using an omni-directional mode and a VHT STA transmitting the multicast frame by using a directional mode among VHT STAs registered to a multicast group, i.e., a VHT STA1, a VHT STA2, and a VHT STA3. The VHT AP can determine a transmit (Tx) antenna mode to be used when the multicast frame is transmitted to each VHT STA according to a specific criterion. For example, the VHT AP can determine the Tx antenna mode based on a location of the VHT STA. The location of the VHT STA is a relative location with respect to the VHT AP, and may be in association with a distance from the VHT STA to the VHT AP or may depend on whether the VHT STA is located in an NLOS of the VHT AP.

For example, when all VHT STAs are located adjacent to the VHT AP or located in a line of sight (LOS), the VHT AP may determine to use only the omni-directional mode for the transmission of the multicast frame. Alternatively, when some VHT STAs are located adjacent to the VHT AP (or located in an LOS) and other VHT STAs are located far from the VHT AP (or located in an NLOS), it may be determined such that the former VHT STAs transmit the multicast frame by using the omni-directional mode and the latter VHT STAs transmit the multicast frame by using the directional mode. Alternatively, when all VHT STAs are located far from the VHT AP (or located in the NLOS), the VHT AP may determine to use only the directional mode for the transmission of the multicast frame.

According to the embodiment of the present invention, the VHT AP determines to use the omni-directional mode and/or the directional mode to transmit the multicast frame, and thereafter reports the determined Tx antenna mode to the VHT STA. This is for allowing VHT STAs receiving the multicast frame to be able to use a receive (Rx) antenna mode in a proper manner according to the Tx antenna mode of the multicast frame. The reason above is that optimal beamforming for an Rx antenna of a VHT STA is differently configured for a case where the VHT AP transmits the multicast frame in the omni-directional mode and a case where the VHT AP transmits the multicast frame in the directional mode. For example, in a case where the VHT AP transmits the multicast frame by using the directional mode with respect to a third terminal (i.e., VHT STA3), the third terminal also adjusts an Rx antenna with respect to the VHT AP in accordance with transmission in the directional mode.

In addition, according to the embodiment of the present invention, in a case where the VHT AP determines to transmit the multicast frame by using the directional mode, other VHT STAs not registered to the multicast group (e.g., a fourth terminal (i.e., VHT STA4)) need to be prevented from accessing to a channel. The reason above is that, in a case where the multicast frame is transmitted using the directional mode, a VHT STA located in a different region may recognize that the channel is in an idle state according to a sensing mechanism of the VHT STA itself.

In order to achieve such a purpose, prior to the transmission of the multicast frame, the VHT AP exchanges a request to send (RTS) frame/clear to send (CTS) frame with the VHT STAs registered to the multicast group or broadcasts a CTS-to-self frame. Exchanging of the RTS frame/CRS frame or broadcasting of the CTS-to-self frame is performed to report a transfer mechanism of a multicast frame and, as to other terminals not registered to the multicast group, to configure a network allocation vector (NAV) during a time for transmitting the multicast frame. A procedure of exchanging the RTS frame and the CTS frame is shown in FIG. 2, and an embodiment of using the CTS-to-self frame will be described later.

First, the VHT AP transmits an RTS frame prior to transmission of a multicast frame (step S11). The RTS frame has a format typically used in the related art, and further includes a Tx antenna mode field (or simply Tx mode field) for reporting which one is used between the omni-directional mode or the direction mode to transmit the multicast frame. For example, the RTS frame may include at least a transmitter address field, a receiver address field, a multicast address field, and the Tx mode field.

The transmitter address field may be set to a medium access control (MAC) address of a device transmitting the RTS frame, e.g., VHT AT. The receiver address field may be set to an MAC address of an STA receiving the RTS frame, e.g., VHT STA. The VHT STA may be an STA selected by a VHT AP that is a device transmitting the RTS frame. The multicast address field may be set to an address of a multicast group for receiving a multicast frame to be transmitted after exchange of the RTS frame and the CTS frame.

The Tx mode field is for setting of a Tx antenna mode of a multicast frame to be transmitted after exchange of the RTS frame and the CTS frame. The Tx mode field may be set to a value indicating the omni-directional mode or a value indicating the directional mode. The Tx antenna mode may be set individually for each VHT STA receiving the multicast frame. For example, a VHT STA1, a VHT STA2, and a VHT STA3 may be all set to the directional mode, and information indicating such setting may be included in the Tx mode field.

Referring continuously to FIG. 2, among VHT STAs which have received the RTS frames, VHT STAs registered to the multicast group transmit CTS frames to the VHT AP in response to the RTS frames (step S12). There is no particular restriction on an order of transmitting each CTS frame by the VHT STAs. Thus, the CTS frames may be transmitted to the VHT AP either simultaneously or sequentially according to a specific transmission protocol. The CTS frame also has a format typically used in the related art. However, according to an embodiment, the CTS frame may further include an Rx antenna mode field (or simply Rx mode field) to be used by the VHT STA to receive the multicast frame. For example, the CTS frame includes at least a receiver address field and a multicast address field, and may further include the Rx mode field.

The receiver address field may be set to an MAC address of an STA receiving a CTS frame, e.g., VHT AP. Herein, the VHT AP is a device transmitting an RTS frame. The multicast address field may be set to an address of a multicast group for receiving a multicast frame to be transmitted after exchange of the RTS frame and the CTS frame. The Rx mode field is for setting an Rx antenna mode of a multicast frame to be transmitted after exchange of the RTS frame and the CTS frame. The Rx mode field may be set to a value indicating the omni-directional mode or a value indicating the directional mode. The Rx antenna mode may report information regarding beamforming performed by a VHT STA transmitting a CTS frame to receive the multicast frame in a subsequent process.

Meanwhile, among VHT STAs which have received the RTS frame, VHT STAs not registered to the multicast group (e.g., VHT STA4) configure an NAV until a time for transmitting a subsequent multicast frame. That is, the VHT STA4 does not attempt to access to a channel during a time when the VHT AP transmits the multicast frame.

Referring continuously to FIG. 2, the VHT STAs which belong to the multicast group and intend to receive a multicast frame in a subsequent process perform beamforming suitable for Tx antenna modes respectively received (step S13). For example, each of the VHT STA1, the VHT STA2, and the VHT STA3 may perform beamforming of Rx antennas for the VHT AP.

The VHT AP transmits the multicast frame to each VHT STA (step S14). In this case, the VHT AP may transmit the multicast frame in either the omni-directional mode or the directional mode to each VHT STA in response to information included in the RTS frame in step S11. Although it is shown in FIG. 2 that the multicast frame is transmitted to all VHT STAs (i.e., VHT STA1, VHT STA2, and VHT STA3), this is for exemplary purposes only.

Figure 3:
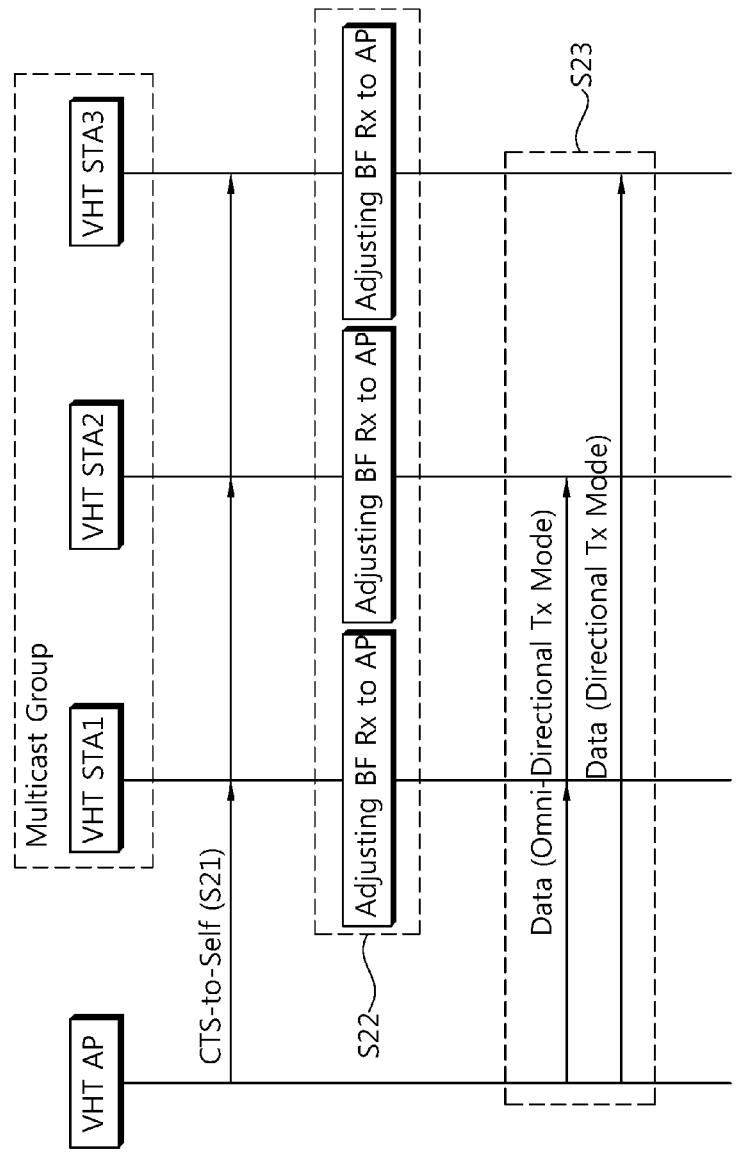
FIG. 3 is a message flow diagram of a multicast procedure according to another embodiment of the present invention.

FIG. 3 is a message flow diagram of a multicast procedure according to another embodiment of the present invention based on the aforementioned assumption. In this embodiment, in order to report to VHT STAs a Tx antenna mode to be used in the transmission of the multicast frame, a device transmitting a multicast frame, e.g., VHT AP, broadcasts a CTS-to-self frame to a VHT STA instead of using a process of exchanging an RTS frame and a CTS frame with VHT STAs. In this sense, the present embodiment differs from the aforementioned embodiment. The remaining processes other than that can use the aforementioned embodiment without any change. The following description will focus on a different aspect with respect to the aforementioned embodiment.

First, among VHT STAs registered to a multicast group (e.g., VHT STA1, VHT STA2, and VHT STA3), a VHT AP transmitting a multicast frame determines a VHT STA transmitting a multicast frame by using an omni-directional mode and a VHT STA transmitting a multicast frame by using a directional mode. The VHT AP may determine a Tx antenna mode to be used for the transmission of the multicast frame with respect to each VHT STA according to a specific rule. In the present embodiment, the VHT AP determines that the VHT STA1 and the VHT STA2 use the omni-directional mode and that the VHT STA3 uses the directional mode, which differs from the previous embodiment in which all VHT STAs use the directional mode.

Further, the VHT AP transmits a CTS-to-self frame prior to the transmission of the multicast frame (step S21). The CTS-to-self frame has a format typically used in the related art, and further includes a Tx antenna mode field (or simply Tx mode field) for reporting which one is used between the omni-directional mode or the direction mode to transmit the multicast frame. For example, the CTS-to-self frame may include at least a receiver address field, a multicast address field, and the Tx mode field.

The receiver address field may be set to an MAC address of an STA transmitting the CTS-to-self frame, i.e., VHT AP. The STA transmitting the CTS-to-self frame is identical to an STA receiving the CTS-to-self frame. The multicast address field may be set to an address of a multicast group for receiving a multicast frame to be transmitted after the transmission of the CTS-to-self frame. The Tx mode field is for setting the Tx antenna mode of the multicast frame to be transmitted after the transmission of the CTS-to-self frame. The Tx mode field may be set to a value indicating the omni-directional mode or a value indicating the directional mode. The Tx antenna mode may be set individually for each VHT STA receiving the multicast frame. For example, the VHT STA1 and the VHT STA2 may be set to the omni-directional mode, and the VHT STA3 may be set to the directional mode.

Referring continuously to FIG. 3, the VHT STAs which belong to the multicast group and intend to receive a multicast frame in a subsequent process perform beamforming suitable for respective Tx antenna modes received by being included in the CTS-to-self frame (step S22). For example, the VHT STA1 and the VHT STA2 may perform beamforming of an Rx antenna with respect to a VHT AP according to the omni-directional mode, and the VHT STA3 may perform beamforming of the Rx antenna with respect to the VHT AP according to the directional mode.

The VHT AP transmits the multicast frame to each VHT STA (step S23). In this case, the VHT AP may transmit the multicast frame in either the omni-directional mode or the directional mode to each VHT STA in response to information included in the CTS-to-self frame in step S21. Although it is shown in FIG. 3 that the multicast frame is transmitted to the VHT STA1 and the VHT STA2 in the omni-directional mode and is transmitted to the VHT STA3 in the directional mode, this is for exemplary purposes only.

Figure 4:
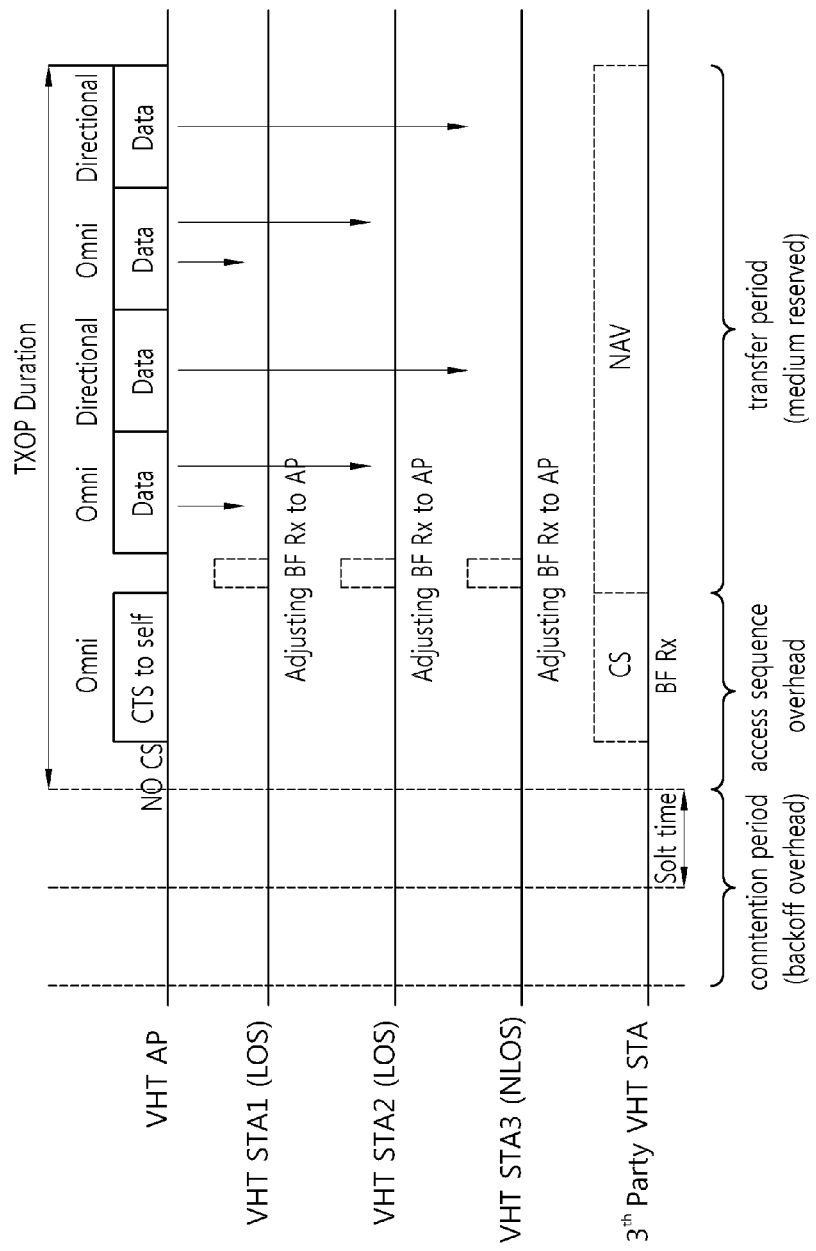
FIG. 4 is a timing diagram corresponding to a message flow diagram of FIG. 3 according to an embodiment of the present invention.

FIG. 4 is a timing diagram corresponding to the message flow diagram of FIG. 3 according to an embodiment of the present invention. Referring to FIG. 4, after a specific contention period elapses, a transmission opportunity (TXOP) is given to a VHT AP. During the given TXOP, the VHT AP first transmits a CTS-to-self frame in an omni-directional mode. The CTS-to-self frame reports Tx antenna modes to be applied respectively to terminals belonging to a multicast group (i.e., VHT STA1, VHT STA2, and VHT STA3), or allows a 3rd party terminal not belonging to the multicast group (i.e., 3rd part VHT STA) to configure an NAV during a specific period including a transfer period. In addition, the VHT AP transmits a multicast frame (i.e., data) to each VHT STA during the transfer period in the omni-directional mode and/or a directional mode. In this case, the data may be repetitively transmitted so that the data can be received by all VHT STAs registered to the multicast group regardless of whether the VHT STAs are located in an LOS or an NLOS.

The aforementioned embodiment of the present invention can also apply to a situation where a coordinator such as a VHT AP does not exist in a VHT WLAN system.

In the VHT WLAN system not employing the coordinator such as the VHT AP, e.g., an independent BSS or the like, a VHT STA transmitting a multicast frame, e.g., a source VHT STA, cannot transmit the multicast frame to the VHT AP in a unicast manner. Therefore, the source VHT STA has to directly multicast/broadcast the multicast frame without the aid of other elements. For this, before the transmission of the multicast frame, the source VHT STA may exchange an RTS frame and a CTS frame or transmit a CTS-to-self frame so that the VHT STAs can perform beamforming for a directional antenna. The RTS/CTS frame or the CTS-to-self frame can be used in the same manner as described in the aforementioned embodiment.

Figure 5:
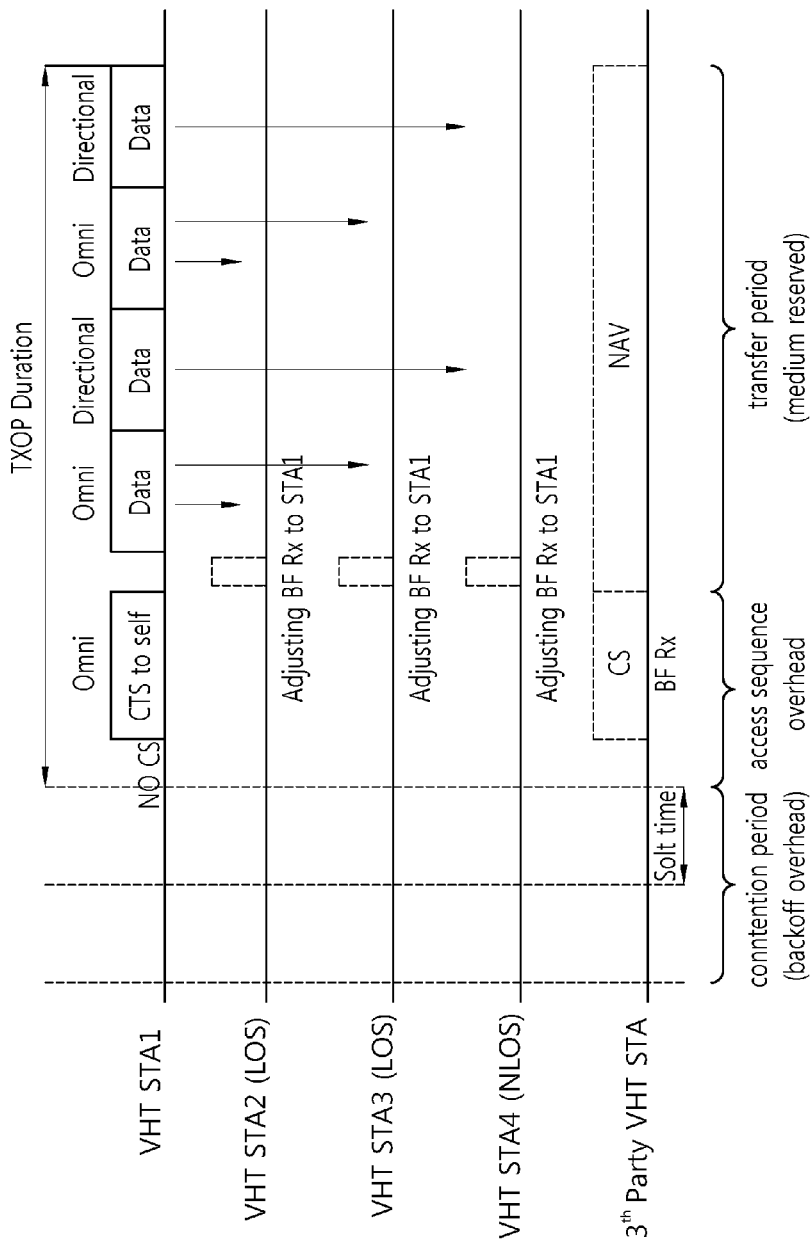
FIG. 5 is a timing diagram of a multicast procedure according to an embodiment of the present invention.

FIG. 5 is a timing diagram of a multicast procedure according to an embodiment of the present invention when there is no coordinator such as a VHT AP. Referring to FIG. 5, a source VHT STA transmits a CTS-to-self frame prior to transmission of a multicast frame. The CTS-to-self frame may include a receiver address field, a multicast address field, and a Tx mode field. The receiver address field may be set to an MAC address of a STA transmitting the CTS-to-self frame, i.e., a source VHT STA. The multicast address field may be set to an address of a multicast group for receiving a multicast frame to be transmitted after the transmission of the CTS-to-self frame. The Tx mode field is for setting a Tx antenna mode of the multicast frame to be transmitted after the transmission of the CTS-to-self frame. The Tx mode field may be set to a value indicating the omni-directional mode or a value indicating the directional mode. The Tx antenna mode may be set individually for each VHT STA receiving the multicast frame. In a case where another VHT STA which has listened the CTS-to-self frame desires to receive a multicast frame of a multicast group specified in the multicast address field, beamforming suitable for the Tx antenna mode can be performed with respect to the source VHT STA which has transmitted the CTS-to-self frame.

According to the aforementioned embodiment of the present invention, the VHT AP transmitting a multicast frame or the source VHT STA can continuously transmit the multicast frame during a specific transfer period (e.g., a duration given by TXOP). In a case where the multicast frame is contiguously transmitted, a Tx antenna mode for a specific VHT STA may be fixed or changeable. For example, if a VHT STA1 moves to a different location, for the VHT STA1, the multicast frame may be transmitted first in the omni-directional mode and then in the directional mode, or may be transmitted first in the directional mode and then in the omni-directional mode.

If there is a change in the Tx antenna mode, the VHT AP needs to report this to a corresponding VHT STA. As one method for reporting this, information on a Tx antenna mode to be used in transmission of a next multicast frame is included in a specific part of a multicast frame (e.g., an MAC header of the multicast frame). That is, the VHT STA can perform beamforming according to an antenna mode used in the transmission of the next multicast frame by using the Tx antenna mode information included in the received multicast frame.

Meanwhile, in a case where a VHT AP or a source VHT STA transmits a multicast frame to one or more VHT STAs in the directional mode, the same multicast frame may be repetitively transmitted. For example, the same multicast frame may be transmitted in the omni-directional mode in one time and then transmitted in the directional mode in a next time to a specific VHT STA. Alternatively, the same multicast frame may be transmitted in the directional mode to each VHT STA. In this case, the specific VHT STA may redundantly receive the same multicast frame, and thus a process of filtering the redundantly received multicast frame may be required for the VHT STA.

The filtering of the redundantly received frame may be performed by using a sequence control field and a traffic identifier (TID) subfield included in the multicast frame. The sequence control field includes a sequence number and a fragment number. An MAC protocol data unit (MPDU), which is a part of the same MAC service data unit (MSDU), has the same sequence number. However, there is a high probability that different MSDUs have different sequence numbers. In addition, the sequence number for the multicast frame can be generated from different counters with respect to each TID and multicast/receiver address pair. This sequence number may be incremented by one with respect to each new MSDU corresponding to the TID and multicast address pair. Instead of using the TID and receiver address pair, a TID and transmitter address pair may be also used.

Hereinafter, a method of detecting a multicast frame received in a duplicate manner according to an embodiment of the present invention will be described in greater detail.

Figure 6:
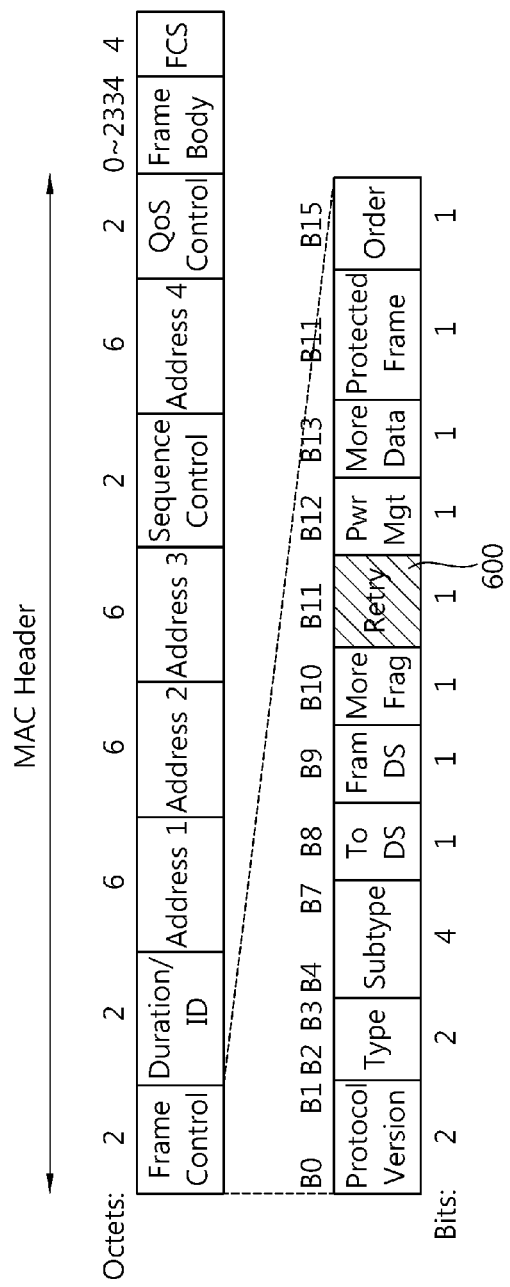
FIG. 6 shows a structure of an institute of electrical and electronics engineers (IEEE) 802.11 medium access control (MAC) frame.

FIG. 6 shows a structure of an IEEE 802.11 MAC frame. In a detection method described below, a retransmission indicator field may be added to provide information indicating whether the multicast frame with the MAC frame structure of FIG. 6 is retransmitted, or a reserved bit of the conventional field may be used. In addition, a field unused in the conventional multicast frame transmission may be used.

As one of subfields constituting a frame control field in the conventional MAC frame structure, a retry field 600 is used in the embodiment of the present invention. However, the present invention is not limited thereto, and thus a newly added retransmission indicator field may be used in the same manner as the method to be described below, or a reserved bit may be used in the implementation of the present invention.

The retry field has a length of one bit. As for an initially transmitted frame, a retry bit which is a value of the retry field is set to 0 in transmission. However, when the frame is retransmitted, the retry bit is set to 1 in the retransmitted frame, and thus it is helpful for a recipient STA to remove a duplicate frame.

When an AP relays a multicast frame by using the conventional method, an open loop transmission scheme is used so that the recipient STA does not transmit any feedback, including an acknowledgement (ACK) frame, in response to a received multicast frame. Therefore, in the conventional method of transmitting a multicast frame in an omni-directional mode, the multicast frame is not retransmitted, and the retry bit is always set to 0 in transmission of the multicast frame.

In a method of transmitting a multicast frame according to an embodiment of the present invention, the multicast frame is transmitted using both an omni-directional mode and a directional mode. In this embodiment, a VHT AP can utilize a retry field of the multicast frame to detect a duplicate frame.

In the method of transmitting the multicast frame according to the embodiment of the present invention, the VHT AP configures the retry bit of the multicast frame in the following manner. When the VHT AP transmits the multicast frame, if the multicast frame to be transmitted is a frame to be retransmitted to another STA at a later time, the retry bit is set to 1. If the multicast frame to be transmitted is not the multicast frame to be retransmitted at the later time, the retry bit is set to 0.

The multicast frame transmitted by setting the retry bit to 1 may be retransmitted by the VHT AP, and thus is stored in a memory (e.g., a buffer, a cache, etc.) so as to be used in frame duplication detection. The memory for storing the multicast frame is not limited to the buffer, the cache, etc., and thus all data storage media capable of temporarily storing the multicast frame can be used.

The multicast frame of which the retry bit is set to 0 is not stored in the memory since there is no possibility of retransmitting the multicast frame by the VHT AP. In addition, as for the multicast frame of which the retry bit is set to 0, if there are multicast frames which are stored in the memory and which have the same recipient address while having a small sequence number, those multicast frames are deleted from the memory.

For this, the VHT AP may update the sequence number of the multicast frames in the following manner. The VHT AP sequentially increments the sequence number of the multicast frames for each pair of (multicast address, TID) by using respective counters. In this case, the number of the counters corresponds to the number of multicast addresses supported.

As another example of the update method, the VHT AP sequentially increments the sequence number of the multicast frames for each pair of (transmitter address, TID) by using the respective counters. In this case, the number of the counters corresponds to the number of transmitter addresses.

As still another example of the update method, the VHT AP sequentially increments the sequence number of the multicast frames for each pair of (multicast address, transmitter address, TID) by using the respective counters. In this case, the number of counters corresponds to combinations of the number of multicast addresses and the number of transmitter addresses.

If the retry bit of the received multicast frame is 1, the VHT STA stores a multicast address, a transmitter address, a TID, a sequence number, and a fragment number in a memory as one tuple. Otherwise, if the retry bit is 0, the VHT STA does not store these elements.

Figure 7:
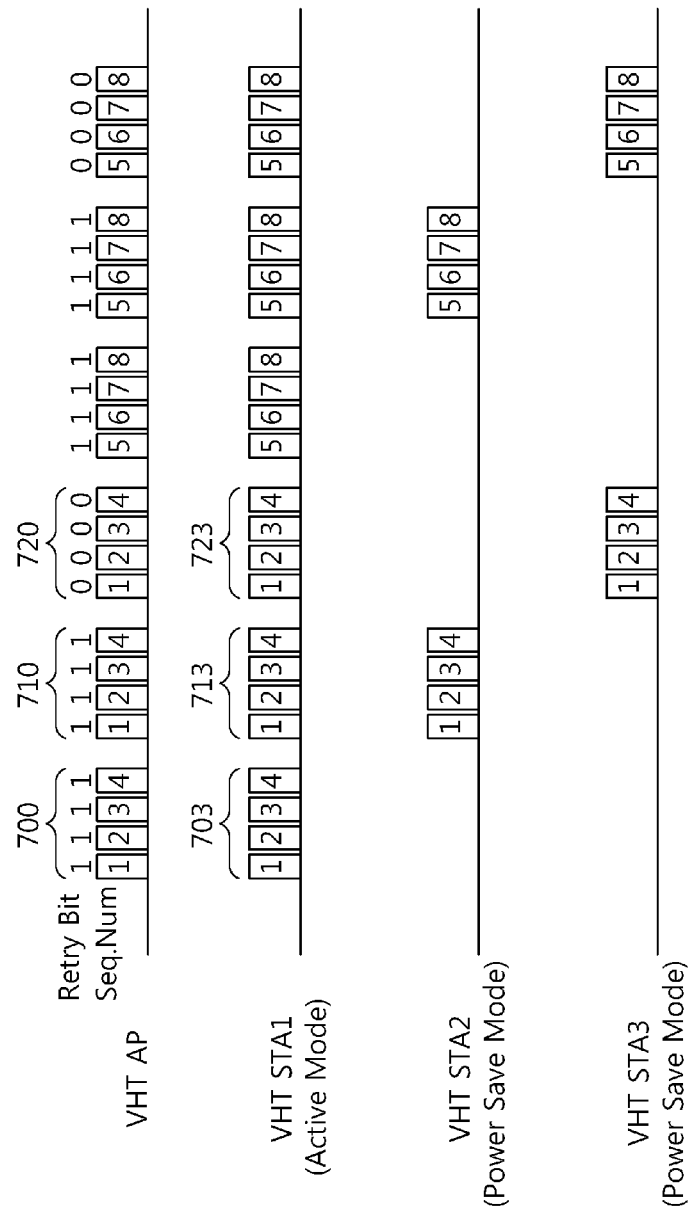
FIG. 7 shows an example of a method of using a retry bit to detect a frame received in a duplicate manner according to an embodiment of the present invention.

FIG. 7 shows an example of a method of using a retry bit to detect a frame received in a duplicate manner according to the present invention.

It is assumed herein that a VHT STA1 operates in an active mode, and a VHT STA2 and a VHT STA3 operate in a power save mode. It is also assumed that a VHT AP transmits a multicast frame to each VHT STA in a directional mode. However, this is for exemplary purposes only. Thus, three or more non-AP STAs may operate either in the active mode or the power save mode, and the VHT AP may transmit the multicast frame to each STA or to an STA group by using an omni-directional mode together with the directional mode.

If the VHT AP transmits a multicast frame group 700, of which a retry bit is set to 1, to the VHT STA1 in the directional mode, the VHT STA1 receiving the multicast frame group stores a multicast address, a transmitter address, a TID, a sequence number, and a fragment number of a multicast frame group 703, of which a retry bit is set to 1, in a memory as one tuple. Thereafter, when the VHT AP sequentially transmits multicast frame groups 710 and 720 to the VHT STA2 and the VHT STA3, respectively, since the VHT STA1 operates in the active mode in the present embodiment, the multicast frame group 710 transmitted toward the VHT STA2 is received as a multicast group 713. In this case, the content of the multicast frame group 713 received by the STA1 is the same content as the previously received multicast frame group 703, which is duplicate reception. Similarly, the multicast frame group 720 transmitted toward the VHT STA3 is received as a multicast frame group 723, which is also duplicate reception. However, the VHT STA1 may detect and discard a duplicate frame by using information stored in the memory.

When transmitting the multicast frame group 720 toward the VHT STA3, a corresponding multicast frame group is not transmitted later, and thus a retry bit is set to 0 in all multicast frames included in the multicast frame group. The VHT STA1 and the VHT STA3 receiving corresponding frames delete information related to those frames from the memory.

In a method of transmitting a multicast frame according to another embodiment of the present invention, the VHT AP may set a retry bit of the multicast frame in the following manner.

When the VHT AP intends to retransmit a previous frame of a currently transmitted multicast frame, a retry bit of the currently transmitted multicast frame is set to 1. When the previous frame of the currently transmitted multicast frame is not intended to be retransmitted, the retry bit of the currently transmitted frame is set to 0. In other words, the retry bit of the transmitted frame delivers information indicating whether the VHT AP will retransmit a multicast frame transmitted immediately before the currently transmitted multicast frame. The information indicating whether the currently transmitted multicast frame will be retransmitted is transmitted by being contained in a retry bit of a multicast frame to be transmitted immediately next to the currently transmitted multicast frame.

Upon receiving the multicast frame, the VHT STA stores the currently received multicast frame in the memory regardless of the retry bit, and uses the stored multicast frame to determine whether a frame received later is a duplicate frame. If the retry bit is set to 1 in the received multicast frame, a multicast frame received immediately before has a possibility of being retransmitted by the VHT AP, and thus is still stored in the memory. If the retry bit is set to 0 in the received multicast frame, the multicast frame received immediately before has no possibility of being retransmitted by the VHT AP, and thus is deleted from the memory. In addition, previously received multicast frames are also deleted since they have no possibility of being retransmitted.

For a received multicast frame, the VHT STA stores a multicast address, a transmitter address, a TID, a sequence number, and a fragment number in the memory as one tuple. If a retry bit of a transmitted multicast frame is 1, no action is taken. Otherwise, if the retry bit is 0, for the received multicast frame, information which is stored in the memory and which has the same pair of (multicast address, transmitter address, TID) while having a small sequence number is deleted from the memory.

Figure 8:
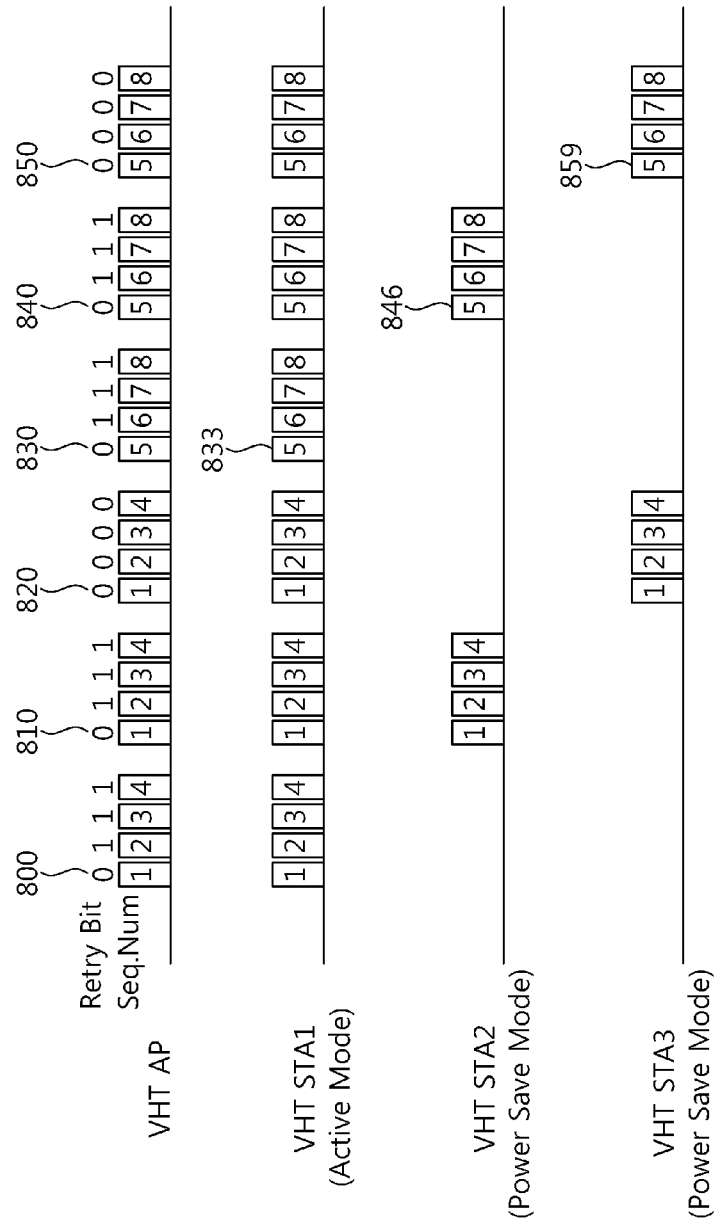
FIG. 8 shows an example of a method of using a retry bit to detect a frame received in a duplicate manner according to another embodiment of the present invention.

FIG. 8 shows a detailed example of a method of using the aforementioned retry bit in a duplication detection of a received frame.

FIG. 8 differs from FIG. 7 in that retry bits of multicast frames 800 and 810 with a sequence number 1 and multicast frames 830 and 840 with a sequence number 5 are set to 1 in FIG. 7 whereas the retry bits thereof are set to 0 in FIG. 8. The retry bits of the multicast frames 800, 810, and 820 with the sequence number 1 contain information indicating whether to retransmit a multicast frame transmitted before the multicast frame with the sequence number 1. However, since there is no multicast frame transmitted before the multicast frame with the sequence number 1, the retry bit is set to 1.

Retry bits of multicast frame 830, 840, and 850 are set to 0 since a previously transmitted multicast frame with a sequence number 4 is no longer transmitted at a time when the multicast frame with the sequence number 5 is transmitted. Upon receiving the multicast frame which has the sequence number 5 and of which the retry bit is set to 0, VHT STAs delete multicast frames which have the sequence numbers 1, 2, 3, and 4 and which are stored in a memory. That is, when a VHT STA1 receives a multicast frame 833, when a VHT STA2 receives a multicast frame 846, and when a VHT STA3 receives a multicast frame 859, the multicast frames which have the sequence numbers 1, 2, 3, and 4 and which are stored in respective memories are deleted. With this method, regardless of whether the VHT STA operates in an active mode or a power save mode, the VHT STA can delete information on the multicast frames 1 to 4 stored in the memory while receiving the multicast frame with the sequence number 5. Therefore, this method can be utilized regardless of an operation mode of a corresponding STA.

Figure 9:
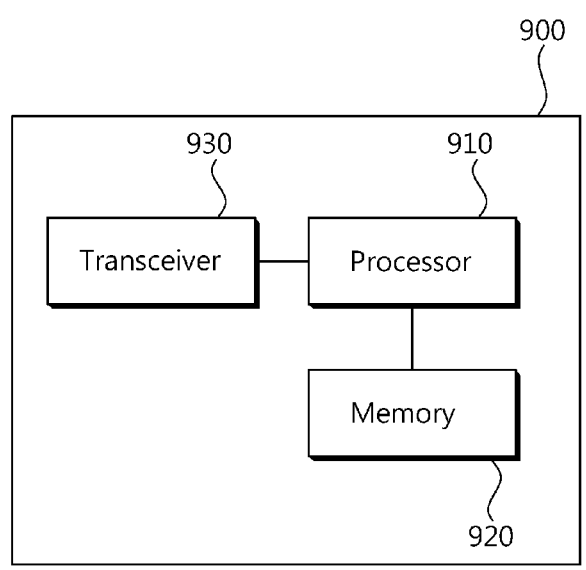
FIG. 9 is a block diagram of a station supporting a transmission method of the present invention.

FIG. 9 is a block diagram showing an STA according to an embodiment of the present invention. An STA 900 includes a processor 910, a memory 920, and a transceiver 930. The transceiver 930 transmits/receives a radio signal, and implements an IEEE 802 physical layer. The transceiver 930 supports an omni-directional mode and a directional mode. The processor 910 is coupled to the transceiver 930, and implements an IEEE 802 MAC layer. The processor 910 can implement the aforementioned method of transmitting a multicast frame, a method of detecting a multicast frame received in a duplicate manner, etc.

The processor 910 and/or the transceiver 930 may include an application-specific integrated circuit (ASIC), a separate chipset, a logic circuit, and/or a data processing unit. The memory 920 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 920 and may be performed by the processor 910. The memory 920 may be located inside or outside the processor 910, and may be coupled to the processor 910 by using various well-known means.

The invention claimed is:

1. A method of transmitting a multicast frame in a wireless communication system, the method comprising:
    transmitting, by a transmitting station to a receiving station, a clear-to-send (CTS) type frame to inform the receiving station about an impending transmission of multicast frames;
    transmitting, by the transmitting station to the receiving station, a first multicast frame of the multicast frames by using a first antenna configuration after transmitting the CTS type frame; and
    transmitting, by the transmitting station to the receiving station, a second multicast frame of the multicast frames by using a second antenna configuration that is different from the first antenna configuration,
    wherein the second multicast frame is a copy of the first multicast frame,
    wherein the second multicast frame uses a sequence number that is the same as the first sequence number in order enable the receiving station to filter out a duplicated multicast frame, and
    wherein the CTS type frame includes a transmitter address field and a transmissions mode field, the address field including an address of the transmitting station that transmits the CTS type frame, the transmission mode field consisting of a single bit indicating whether at least one multicast frame is to be transmitted by the transmitting station.

2. The method of claim 1, wherein the first antenna configuration includes a first antenna weight vector and the second antenna configuration includes a second antenna weight vector.

3. The method of claim 1, wherein the first antenna configuration relates to an omni-directional antenna and the second antenna configuration relates to a directional antenna.

4. The method of claim 1, wherein the first multicast frame includes a first retry bit that is set to one, and the second multicast frame includes a second retry bit that is set to one.

5. The method of claim 1, wherein the wireless communication system is operated in a 60 GHz band.

6. The method of claim 1,
    wherein the first multicast frame includes a medium access control service data unit (MSDU), a first destination address field being set to a multicast address and a first sequence field including the first sequence number, and
    wherein the second multicast frame includes the MSDU, a second destination address field being set to the multicast address and a second sequence field including the first sequence number.

7. The method of claim 1, wherein the CTS type frame comprises a Clear-To-Send (CTS)-to-self frame to the receiving station, the CTS-to-self frame being a CTS frame transmitted without receiving a Request to Send (RTS) frame.

8. The method of claim 1, wherein the transmitting station is an access point.

9. A device configured for transmitting a multicast frame in a wireless communication system, the device comprising:
    a memory; and
    a processor operatively coupled with the memory and configured to:
        transmit, to a receiving station, a clear-to-send (CTS) type frame to inform the receiving station about an impending transmission of multicast frames;
        transmit, to the receiving station, a first multicast frame of the multicast frames to the receiving station by using a first antenna configuration after transmitting the CTS type frame; and
        transmit, to the receiving station, a second multicast frame of the multicast frames to the receiving station by using a second antenna configuration that is different from the first antenna configuration,
    wherein the second multicast frame is a copy of the first multicast frame,
    wherein the second multicast frame uses a sequence number that is the same as the first sequence number in order to enable the receiving station to filter out a duplicated multicast frame, and
    wherein the CTS type frame includes a transmitter address field and a transmission mode field, the address field including an address of a transmitting station that transmits the CTS type frame, the transmission mode field consisting of a single bit indicating whether at least one multicast frame is to be transmitted by the transmitting station.

\* \* \* \* \*